(12) United States Patent
Hurson (10) Patent No.: US 9,771,722 B2
(45) Date of Patent: Sep. 26, 2017

(54) FLOOR TILE

(71) Applicants: Ryan Patrick Hurson, Warrenpoint (GB); Everardus Johannes Maria Van Leusden, Maarssen (NL); Michael Paul Nicholas Atkins, Pulloxhill (GB)

(72) Inventor: Ryan Patrick Hurson, Warrenpoint (GB)

(73) Assignees: Ryan Patrick Hurson, Warren Point, County Down (GB); Everardus Johannes Maria Van Leusden, Maarssen (NL); Michael Paul Nicholas Atkins, Bedfordshire (GB)

( * ) Notice: Subject to any disclaimer, the term of this patent is extended or adjusted under 35 U.S.C. 154(b) by 0 days.

(21) Appl. No.: 14/453,130

(22) PCT Filed: Feb. 7, 2013

(86) PCT No.: PCT/EP2013/052447
§ 371 (c)(1),
(2) Date: Aug. 6, 2014

(87) PCT Pub. No.: WO2013/117653
PCT Pub. Date: Aug. 15, 2013

(65) Prior Publication Data
US 2015/0284965 A1    Oct. 8, 2015

(30) Foreign Application Priority Data
Feb. 7, 2012    (GB) .................................. 1202084.8

(51) Int. Cl.
*E04C 2/00*    (2006.01)
*E04F 15/02*    (2006.01)
(Continued)

(52) U.S. Cl.
CPC .... *E04F 15/02038* (2013.01); *B32B 37/1027* (2013.01); *B32B 37/1284* (2013.01);
(Continued)

(58) Field of Classification Search
CPC .......... E04F 15/02038; E04F 15/02005; E04F 2201/095; E04F 2201/096; E04F 2201/098; E04F 15/087; E04C 2/38; B32B 37/24
See application file for complete search history.

(56) References Cited

U.S. PATENT DOCUMENTS 4,287,693 A * 9/1981 Collette ............. A47G 27/0212
428/134
5,170,601 A    12/1992 Geisen
(Continued)

FOREIGN PATENT DOCUMENTS

CA    2596576    12/2013
CN    102251632    11/2011
(Continued)

OTHER PUBLICATIONS

Hurson, PCT Serial No. PCT/EP2013/052447 filed Feb. 7, 2013, International Search Report and Written Opinion dated Oct. 22, 2013, 8 pages.
(Continued)

*Primary Examiner* — Brian Mattei
*Assistant Examiner* — Gisele Ford
(74) *Attorney, Agent, or Firm* — Brian S. Steinberger; Law Offices of Brian S. Steinberger, P.A.

(57) ABSTRACT

Floor tiles, systems and methods of interconnecting floor tiles in which the tile(s) have a base substrate and a laminate layer. The substrate can have upstanding edges on a top surface where the edges define a rim at a perimeter of the substrate for aligning the laminate layer on the top surface
(Continued)

of the substrate. The substrate can have connecting means for engaging with connecting means of a substrate of another tile to form an interconnected floor system. By engaging the connecting means of a tile with another tile aligns and positions a side edge of the tile with the side edge of the another file in a side by side arrangement to provide a grout effect for the tiles when they are connected.

9 Claims, 7 Drawing Sheets (51) Int. Cl.
E04F 15/10 (2006.01)
B32B 37/10 (2006.01)
B32B 37/12 (2006.01)
B32B 37/24 (2006.01)

(52) U.S. Cl.
CPC ............ B32B 37/24 (2013.01); E04F 15/107 (2013.01); *B32B 2471/00* (2013.01); *E04F 2201/091* (2013.01); *E04F 2201/095* (2013.01); *E04F 2201/098* (2013.01); *E04F 2203/065* (2013.01); *Y10T 156/10* (2015.01)

(56) References Cited

U.S. PATENT DOCUMENTS

| 5,212,842 | A | * | 5/1993 | Glydon | A63H 33/04 428/44 |
| 5,616,389 | A | | 4/1997 | Blatz | |
| 7,610,731 | B1 | * | 11/2009 | Collison | 52/591.3 |
| 8,037,648 | B2 | * | 10/2011 | Vanderhoef | E04F 15/105 52/177 |
| 8,806,831 | B1 | * | 8/2014 | Dreyer | E04F 15/02038 52/177 |
| 9,181,697 | B2 | * | 11/2015 | Masanek, Jr. | E04C 2/20 |
| 9,339,981 | B2 | * | 5/2016 | Masanek, Jr. | B29D 99/0057 |
| 2002/0189176 | A1 | * | 12/2002 | Stegner | E01C 5/20 52/177 |
| 2003/0131549 | A1 | | 7/2003 | Kappeli | |
| 2005/0193669 | A1 | * | 9/2005 | Jenkins | E01C 5/20 52/392 |
| 2006/0062955 | A1 | * | 3/2006 | Liu et al. | 428/40.1 |
| 2006/0070314 | A1 | * | 4/2006 | Jenkins | E01C 13/045 52/177 |
| 2006/0127647 | A1 | * | 6/2006 | Thrush | 428/172 |
| 2006/0210762 | A1 | * | 9/2006 | Tachauer | 428/99 |
| 2006/0260223 | A1 | | 11/2006 | Wang | |
| 2008/0127593 | A1 | * | 6/2008 | Janesky | E04F 15/18 52/581 |
| 2009/0047451 | A1 | * | 2/2009 | Huss | B29C 39/003 428/33 |
| 2009/0239021 | A1 | * | 9/2009 | Wise | 428/58 |
| 2011/0011020 | A1 | | 1/2011 | Shen | |
| 2011/0104434 | A1 | * | 5/2011 | Masanek, Jr. | E01C 5/226 428/137 |
| 2011/0113713 | A1 | * | 5/2011 | Lui | 52/391 |
| 2011/0183101 | A1 | * | 7/2011 | Voith et al. | 428/53 |
| 2013/0111836 | A1 | * | 5/2013 | Masanek, Jr. | E04B 5/48 52/302.1 |

FOREIGN PATENT DOCUMENTS

| KR | 2000176900000 | 7/1979 |
| KR | 2002590230000 | 1/2002 |
| KR | 1020147023720 | 8/2014 |
| WO | 9936638 | 7/1999 |
| WO | 2009055852 | 5/2009 |

OTHER PUBLICATIONS

Hurson, Application No. GB1202084.8, European search report dated Feb. 6, 2013, 1 page.

* cited by examiner

FLOOR TILE

CROSS REFERENCE TO RELATED APPLICATIONS

This application is a national filing based on International Application No. PCT/EP2013/052447, filed Feb. 7, 2013, which claims the benefit of priority to United Kingdom Patent Application No. GB1202084.8 filed Feb. 7, 2012. The entire disclosure of each of the applications listed in this paragraph are incorporated herein by specific reference thereto.

FIELD OF THE INVENTION

The present invention relates to a floor tiles, and in particular to floor tiles, systems and methods of interconnecting floor tiles.

BACKGROUND OF THE INVENTION

Modular flooring system having tiles with an interlocking structure are known in the prior art. For example, US2011/0011020 discloses an interlocking plastic tile structure having a PVC base layer in which a plurality of protruding tongues and grooves are provided at respective sides of the tile for connecting with an adjacent tile. Each tile comprises a PVC base or substrate layer, a surface layer with an attractive pattern (such as stone material leather, ceramic, rubber, wood and the like) thereon adhered to the base layer, and a transparent protective layer on the surface layer to protect the pattern. In use, the tiles are interconnected using the tongue and groove system to provide an modular flooring arrangement which eliminates the need to apply adhesive to the floor when laying the tiles, thereby making installation of the tiles more efficient.

However, in the above system significant problems arise in the tile manufacturing process, including difficulties in accurately positioning the surface pattern layer on the base layer, and shrinkage of layers during the moulding and curing process causing the layers not to be perfectly square, thereby resulting in an imperfect fit between the base and the surface layer.

It is therefore an object of the present invention to provide a tile and method of forming a tile which alleviates the above-mentioned disadvantages.

SUMMARY OF THE INVENTION

A primary objective of the present invention is to provide floor tiles, systems and methods of interconnecting floor tiles that overcome difficulties in accurately positioning the surface pattern layer on the base layer, and reduce shrinkage of layers during the moulding and curing process causing the layers not to be perfectly square, thereby resulting in a more perfect fit between the base and the surface layer.

Accordingly, the present invention provides a tile can include a base substrate and a laminate layer, characterised in that the substrate has upstanding edges on a top surface thereof, whereby the edges define a rim at a perimeter of the substrate for aligning the laminate layer on the top surface of the substrate.

In another embodiment of the invention, the rim extends around the full perimeter of the top surface of the substrate to form a nest with the top surface on the substrate.

In another embodiment of the invention, the substrate comprises connecting means for engaging with connecting means of a substrate of a further tile to form an interconnected flooring system.

Preferably, the connecting means comprises a plurality of protruding tongues and grooves at adjacent sides of the substrate.

Preferably, a protruding tongue of the substrate is engaged in a groove of the substrate of another tile to connect adjacent tiles to form the flooring system.

In another embodiment of the invention, engaging the connecting means of a tile with a further tile aligns and positions a side edge of the tile with the side edge of the further tile in a side by side arrangement. This provides a grout effect for the tiles when connected.

Preferably, the top surface of the substrate extends over connecting means on at least one side of the substrate.

In another embodiment of the invention, the laminate layer is bonded to the substrate layer using an adhesive.

In a further aspect of the present invention there is provided a method of forming a tile can include the steps of forming a base substrate having upstanding edges on a top surface thereof, whereby the edges define a rim at a perimeter of the top surface, applying an adhesive to a bottom surface of a laminate layer, aligning the laminate layer within the rim such that the bottom surface of the laminate layer sits on the top surface of the substrate, and bonding the laminate layer to the substrate to form the tile.

In another embodiment of the invention, the method can include the step of: operating an injection moulding machine to form the base substrate.

In another embodiment of the invention, the method can include the step of: removing the base substrate from the injection moulding machine and allowing the base substrate to cool.

In another embodiment of the invention, the method can include the step of: operating a roller coater machine to apply adhesive to the laminate layer.

In another embodiment of the invention, the method can include the step of: applying pressure to the laminate layer on the substrate.

Preferably, the step of applying pressure to the laminate layer on the substrate can include operating a nip-roller machine.

In another embodiment of the invention, the injection moulding tool can be manufactured with a machined recess on one half of the tool to create the rim which extends around the full perimeter of the top surface of the substrate and also a raised insert to create the nest area within the top surface of the substrate to accept the laminate layer.

Further objects and advantages of this invention will be apparent from the following detailed description of the presently preferred embodiments which are illustrated schematically in the accompanying drawings.

DETAILED DESCRIPTION OF PREFERRED EMBODIMENTS

The present invention will now be described with reference to the accompanying drawings which show, by way of example only, embodiments of a duvet cover according to the invention. In the drawings:

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

A list of components will now be described.
1 Tile
2 Base substrate
3 Laminate layer
4 Upstanding edge
5 Top surface
6 Connecting means
7 Plurality of protruding tongues
8 Grooves
10 Flooring system Referring to the drawings, there is shown a tile, indicated generally by the reference numeral 1, comprising a base substrate, indicated generally by the reference numeral 2 and a laminate layer 3. The substrate layer 2 has an upstanding edge 4 on a top surface 5 thereof, the edge 4 defining a rim at a perimeter of the substrate 2 for aligning the laminate layer 3 on the top surface 5. In the instance shown, the rim 4 extends around the full perimeter of the top surface 5 of the substrate 2 to form a nest on the substrate 2. The laminate layer 3 is bonded to the substrate layer 2 within the nest using an adhesive which may be applied to the laminate 3 or the substrate 2.

Figure 6:
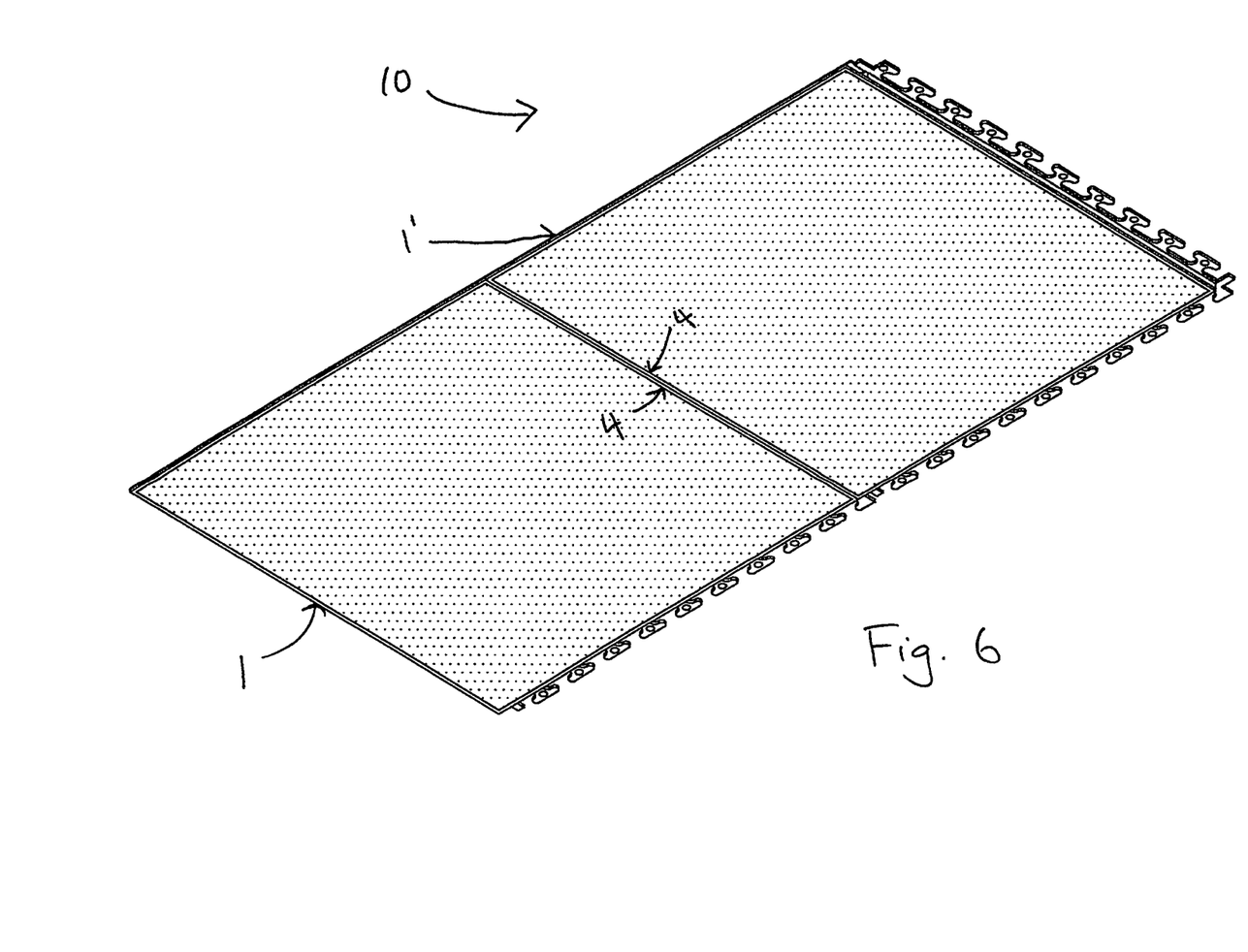
FIG. 6 is a perspective view showing two interconnected tiles.
Figure 7:
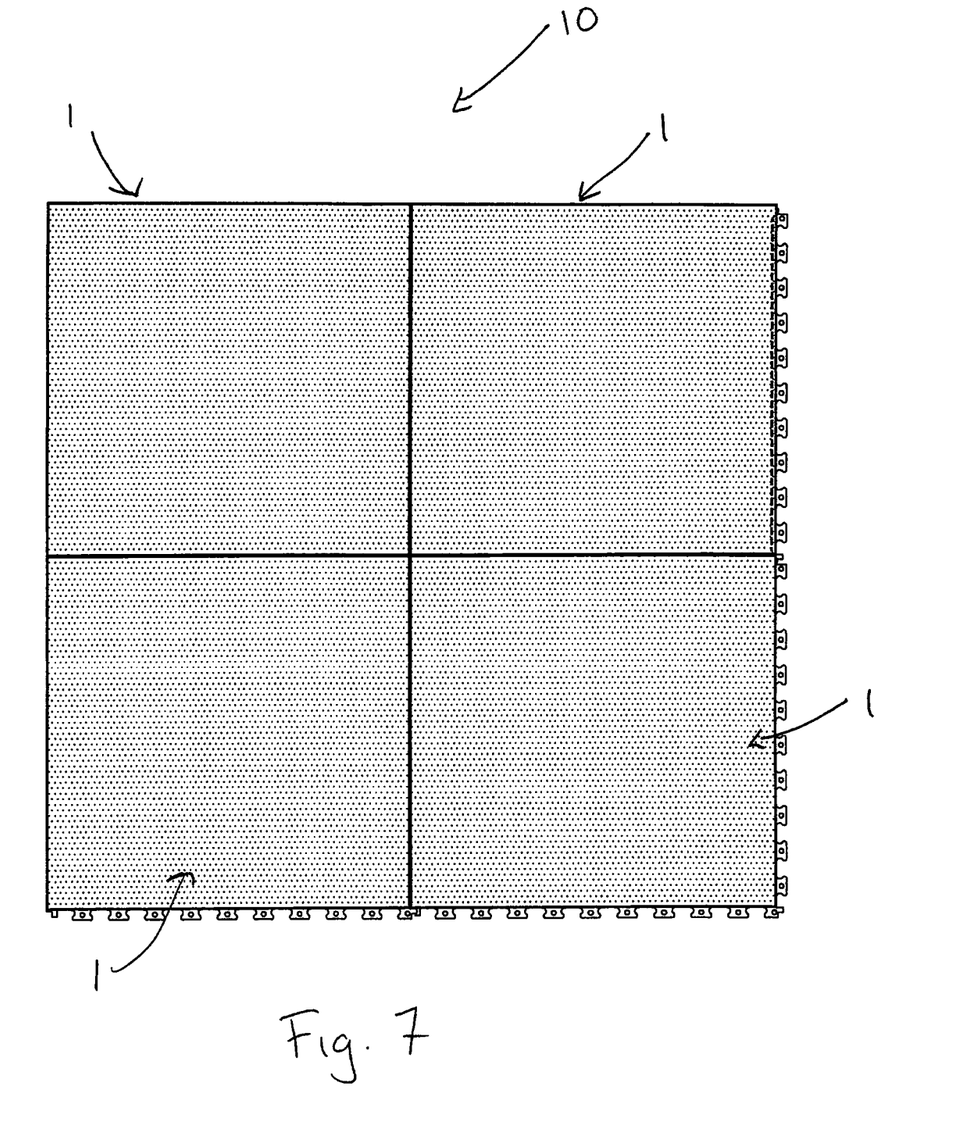
FIG. 7 is a top view showing four interconnected tiles.

The substrate 2 comprises connecting means, indicated generally by the reference numeral 6, for engaging with connecting means 6 of a substrate layer 2 of a further tile 1 to form an interconnected flooring system (see FIGS. 6 and 7). The connecting means 6 comprises a plurality of protruding tongues 7 and grooves 8 at adjacent sides of the substrate 2. The top surface 5 of the substrate 2 extends over connecting means 6 on at least one side of the substrate layer 2.

Figure 1:
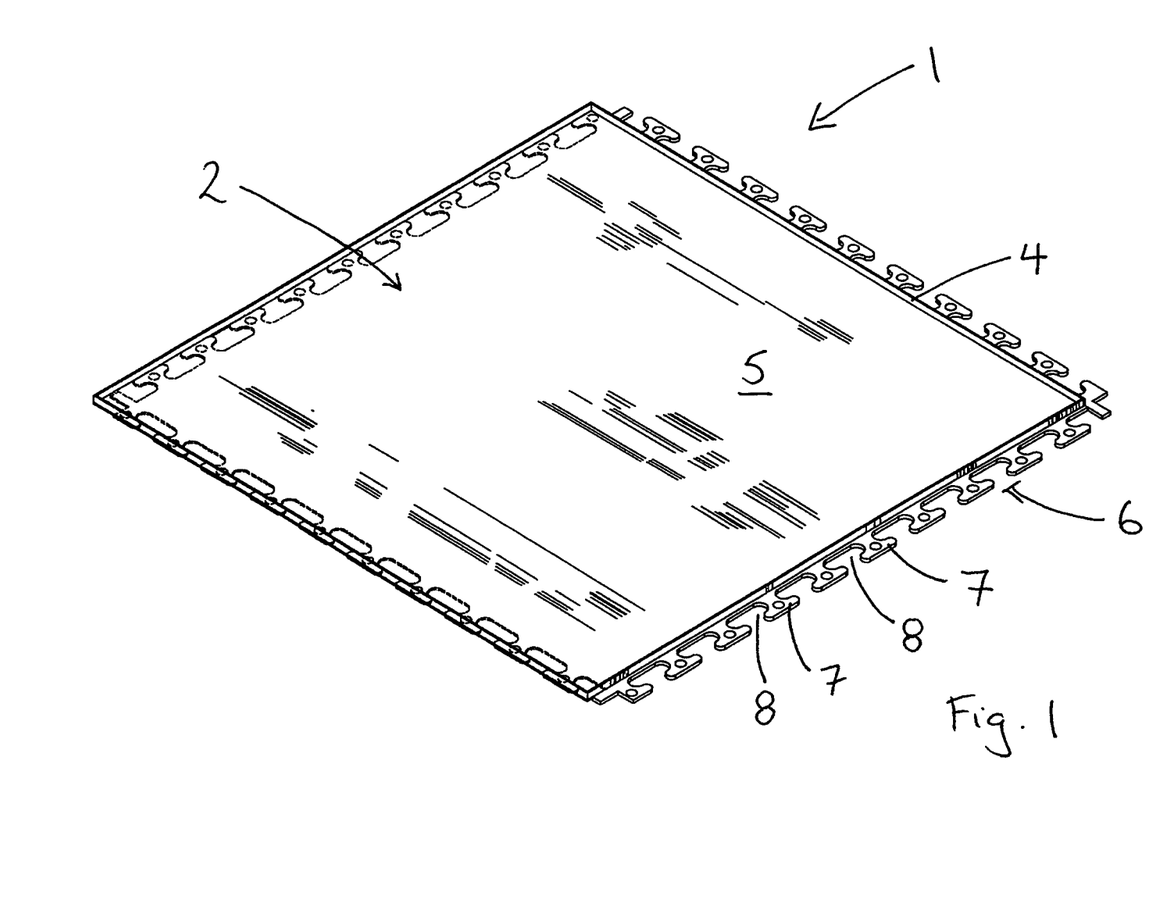
FIG. 1 is a perspective view of a substrate layer of a tile according to the invention.
Figure 2:
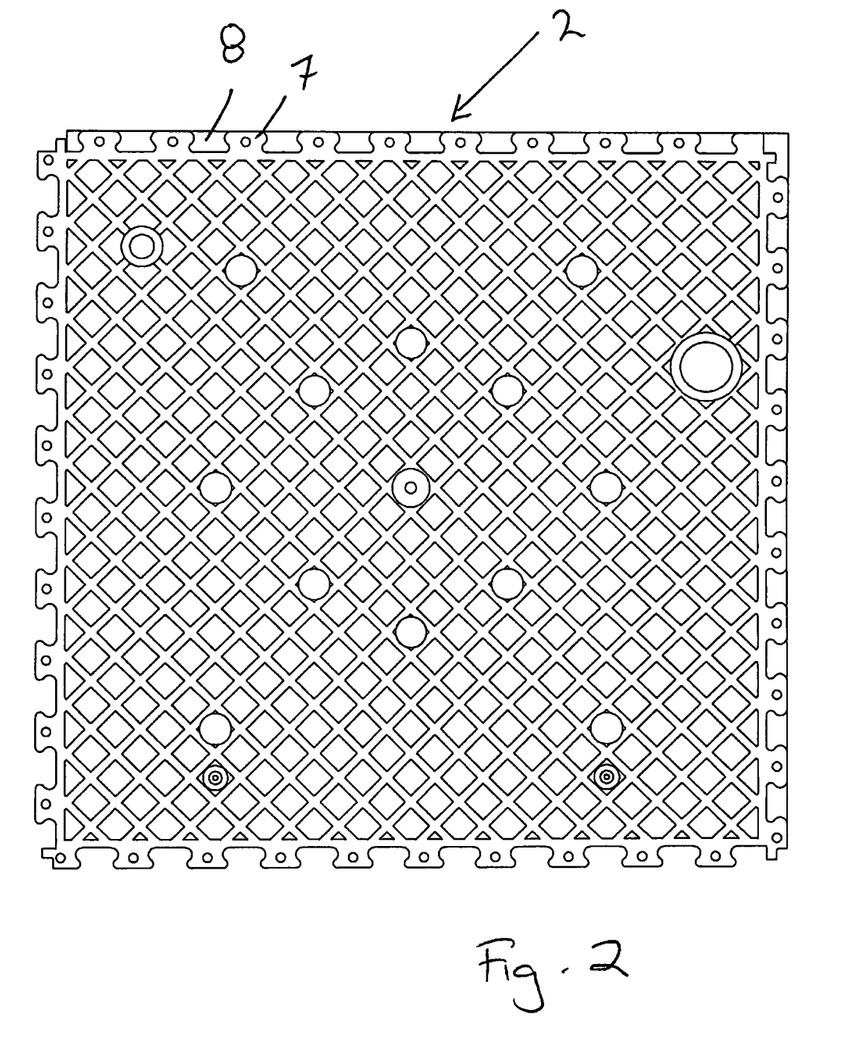
FIG. 2 is an underside view of the substrate layer in FIG. 1.
Figure 3:
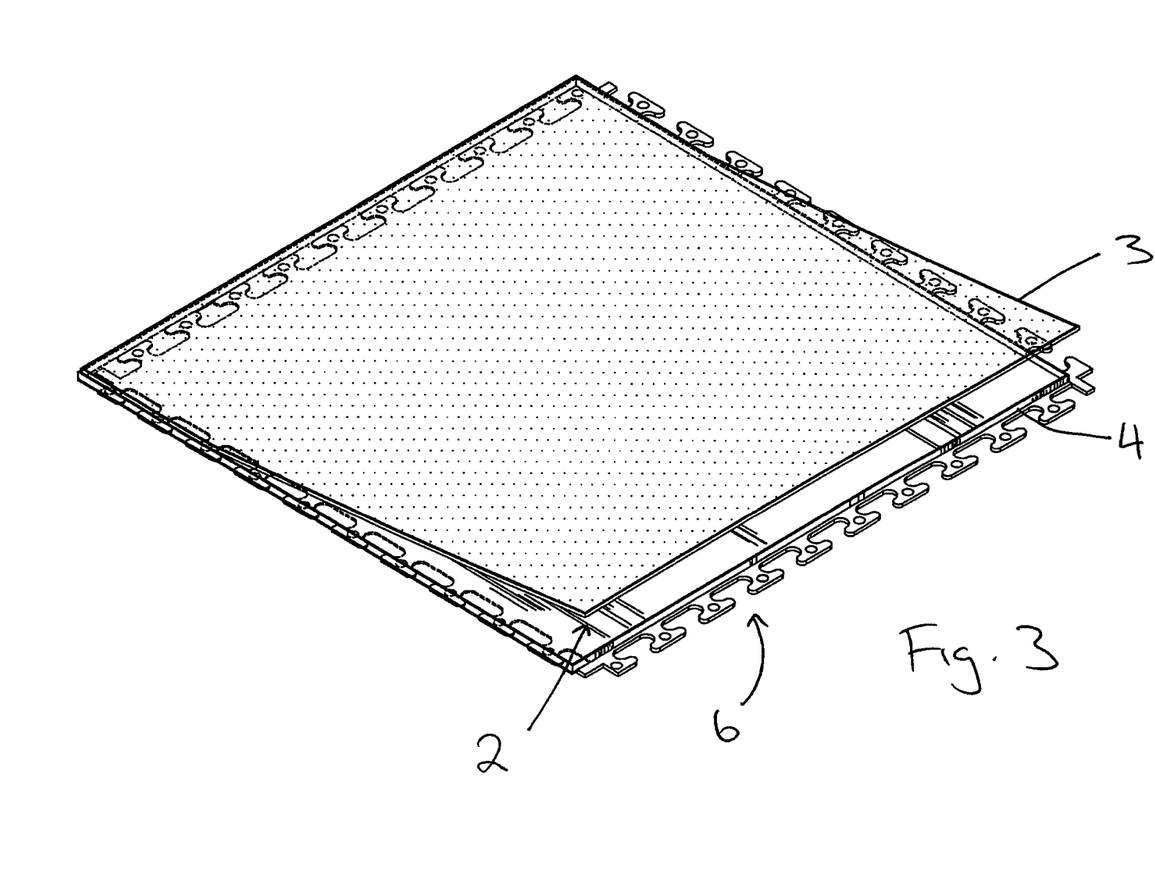
FIG. 3 is a perspective view of the substrate layer in FIG. 1 receiving a laminate.
Figure 4:
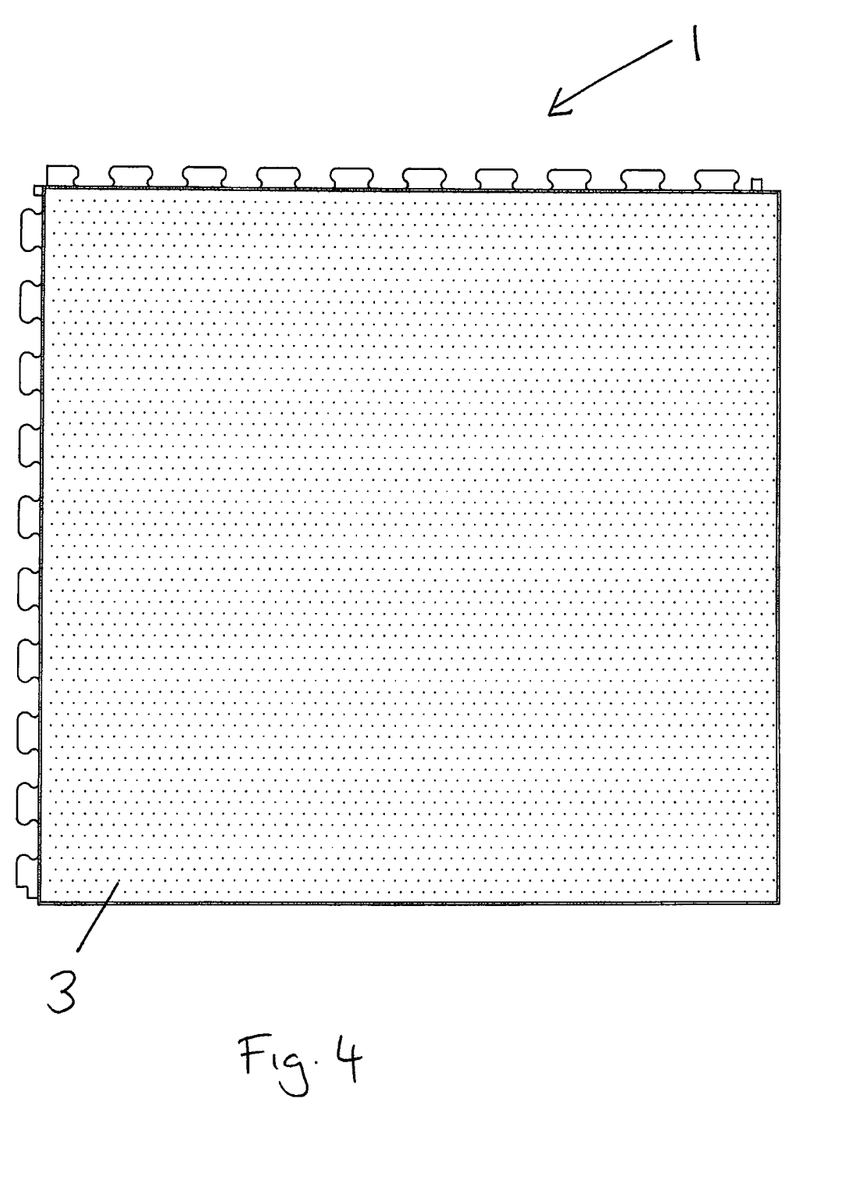
FIG. 4 is a top view of the tile according to the invention.
Figure 5:
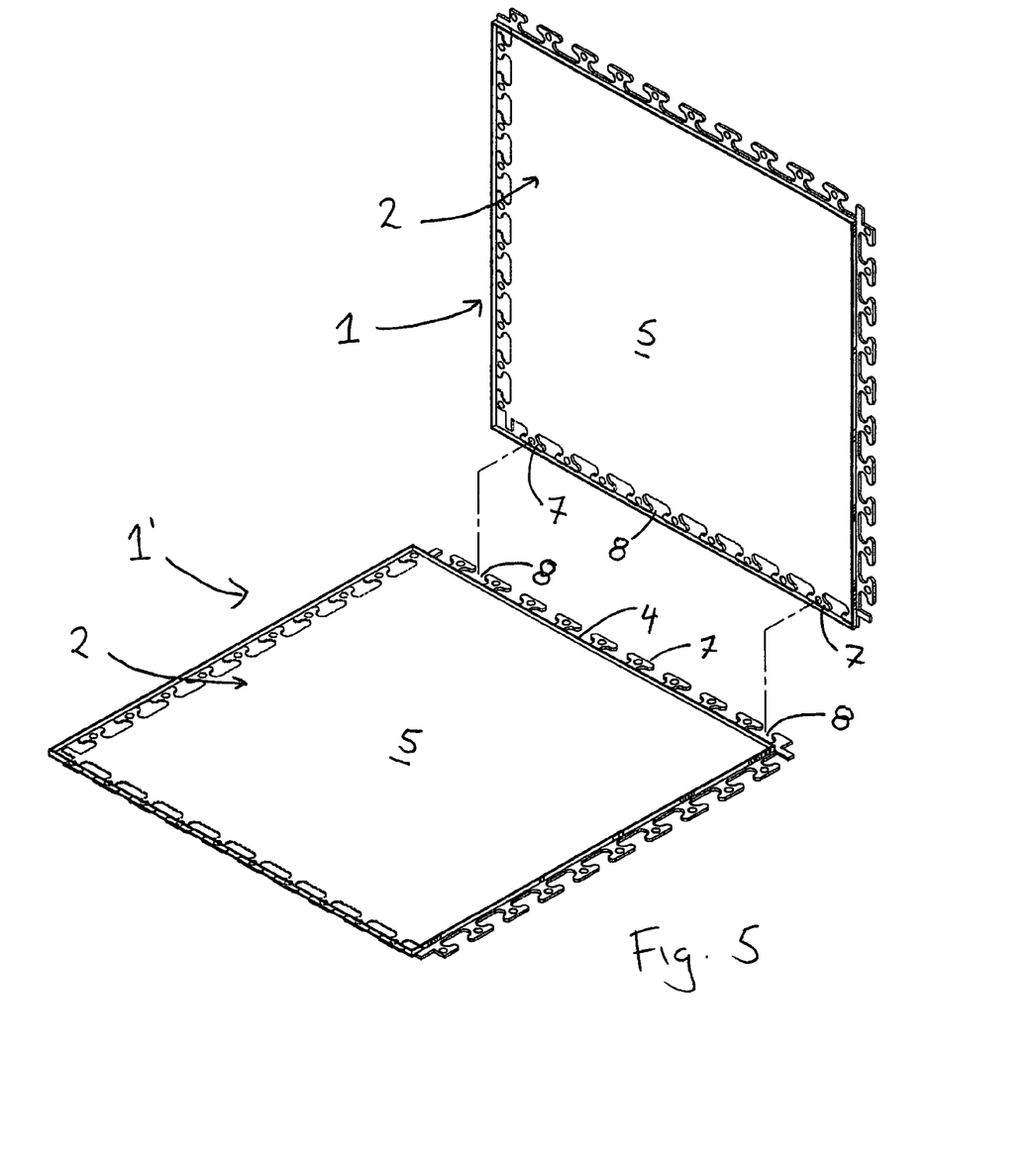
FIG. 5 is a perspective view showing the interconnection of two tiles with the laminate removed for exemplary purposes.

As shown in FIG. 5, a protruding tongue 7 of the substrate layer 2 of one tile 1 is engaged in a groove 8 of the substrate layer 2 of another tile 1' to connect adjacent tiles 1, 1' to form a flooring system 10 (see FIGS. 6 and 7). In FIG. 5, for exemplary purposes the laminate 3 of the tiles 1, 1' is shown removed so that the connecting means 6 of the substrates 2, 2' can be clearly illustrated, and it should be understood that when tiles 1, 1' are being interconnected they may be done so with or without the laminate 3 bonded to the substrate layer 2. Any number of tiles 1 may be joined to form the required flooring system 10.

As shown, the portion of the top surface 5 of the substrate layer 2 which extends over the connecting means 6 of tile 1 will cover the connecting means 6 of the adjacent tile 1' when the two tiles 1, 1' are interconnected. In this way engaging the connecting means 6 of adjacent tiles 1, 1' aligns and positions the side edge 4 of the tile 1 with the side edge 4 of the further adjacent tile 1' in a side by side arrangement. This provides a grout effect consisting of the edges 4 of two interconnected tiles 1, 1. The substrate layer 2 can be made of any color as required to provide the required colour for the grout effect.

There is also provided a method of forming a tile 1 comprising the initial step of forming a base substrate 2 having upstanding edges 4 which define a rim 4 at a perimeter of the top surface of the substrate 2. An injection moulding tool may be fitted to an injection moulding machine an appropriately operated to form the base substrate 2 and the base substrate 2 removed from the machine when formed and allowed to dry. Such a tool is fitted to the machine between the machine plates and secured using mould clamps.

Flexible PVC in any of various colours is then vacuum fed to a hopper of the moulding machine and gravity feed into a barrel of the machine where it is melted at between 180-190 degrees Celsius. The injection moulding machine is set to allow a screw inside the barrel to pick up sufficient melted material that is then injected through a nozzle of the barrel and into the closed mould at pre-set speeds and pressures. The mould remains closed for a pre-set time to allow cooling. The mould then opens and the substrate with moulded edges all around forming a receiving nest and interlocking keys is manually or automatically ejected from the mould. This moulded interlocking tile substrate 2 is then stacked on cooling racks for about 24 hours. It will be understood that the dimensions for the substrate may be moulded as required or as desired.

Next, an adhesive is applied to a bottom surface of a laminate layer 3. Such a step may be performed by operating a roller coater machine to apply adhesive to the laminate layer. The adhesive may be a hot melt polyurethane adhesive or any other suitable adhesive and the laminate layer 3 may comprise a PVC (polyvinyl chloride) backing layer, a printed middle layer having a desired surface finish or effect for the tile 1, such as wood, porcelain, plastic etc, and a clear PVC top layer. The laminate layer 3 is sized as appropriate to sit in the nest on the substrate.

Next, the laminate layer 3 is oriented as required and placed into the receiving nest of the substrate and aligned within the rim 4 so that the bottom surface of the laminate layer 3 sits on the top surface 5 of the substrate 2. Pressure is then applied to the laminate layer 3 on the substrate 2, such as by operating a nip-roller machine, so that the laminate layer 3 is bonded to the substrate 2 to form the tile 1. The completed interlocking tile 1 is then stacked flat on a cooling rack for a further 24 hours before packaging.

Aspects of the present invention have been described by way of example only and it should be appreciated that additions and/or modifications may be made thereto without departing form the scope thereof.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

The invention claimed is:

1. A floor tile comprising a base substrate and a laminate layer, the base substrate comprising:
  a top surface having a perimeter and an integrally formed upstanding edge that extends fully around the perimeter upright on the top surface, wherein the laminate layer is aligned on the top surface of the base substrate between the upstanding edge, and
  connectors provided at sides of the base substrate to connect the floor tile with an adjacent floor tile having corresponding connectors to form a floor system of connected floor tiles, the connectors consisting of protruding tongues and grooves at adjacent sides of the base substrate,
  whereby, the top surface of the base substrate of the floor tile extends over the protruding tongues and grooves on at least one side of the base substrate, such that when the floor tiles are connected, the top surface of the base substrate further extends over the protruding tongues and grooves provided at a side of the adjacent floor tile, and the upstanding edge of the floor tile is placed in a side by side arrangement with a corresponding upstanding edge provided on a top surface of the adjacent floor tile to provide a grout effect comprising the upstanding edges of the connected floor tiles, wherein
  the protruding tongues consist of T shapes, rectangular shapes and L shapes, and wherein the grooves consist of T shaped openings, rectangular shaped openings and L shaped openings, and wherein the T shaped openings mateably interconnect with the T shaped protruding tongues, the rectangular shaped openings mateably interconnect with the rectangular shaped protruding tongues, the L shaped openings mateably interconnect with the L shaped protruding tongues, the T shaped protruding tongues and the T shaped openings of the grooves alternating with one another along each side of the base substrate, wherein all of the T shaped protruding tongues are identical in size with one another, and all of the grooves having the T shaped openings are identical in size with one another.

2. The floor tile as claimed in claim 1, in which the laminate layer is bonded to the substrate layer using an adhesive.

3. The floor tile as claimed in claim 1, in which the base substrate is an injection molded substrate.

4. A floor system comprising a plurality of floor tiles according to claim 1.

5. The floor tile as claimed in claim 1, wherein the protruding tongues include oval shaped heads portions, and the grooves include oval shaped openings, which mateably interconnect with the oval shaped head portions.

6. The floor tile as claimed in claim 1, wherein two adjacent sides of the base substrate comprise the alternating protruding tongues and grooves outwardly extending from perimeter edges of the base substrate, and two additional sides of the base substrate comprise the alternating protruding tongues and grooves extending inwardly from the perimeter edges of the base substrate, wherein the laminate layer completely covers the alternating protruding tongues and grooves inwardly extending from the perimeter edges of the base substrate.

7. The floor tile of claim 1, wherein one of the rectangular shaped protruding tongues protrudes outward from at least one corner of the base substrate.

8. The floor tile of claim 7, wherein one of the L shaped protruding tongues protrudes outward from at least one corner of the base substrate.

9. The floor tile of claim 1, wherein one of the L shaped protruding tongues protrudes outward from at least one corner of the base substrate.

* * * * *